Aug. 19, 1941.  W. S. HUNT ET AL  2,253,430
RADIO CARTOGRAPHIC POSITION INDICATOR
Filed Oct. 6, 1938  3 Sheets-Sheet 1
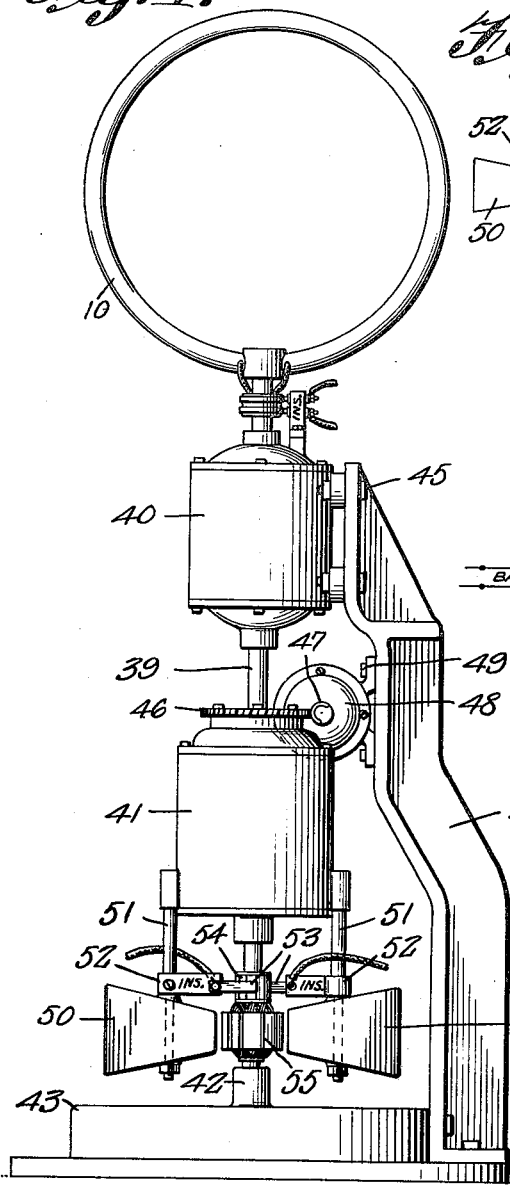
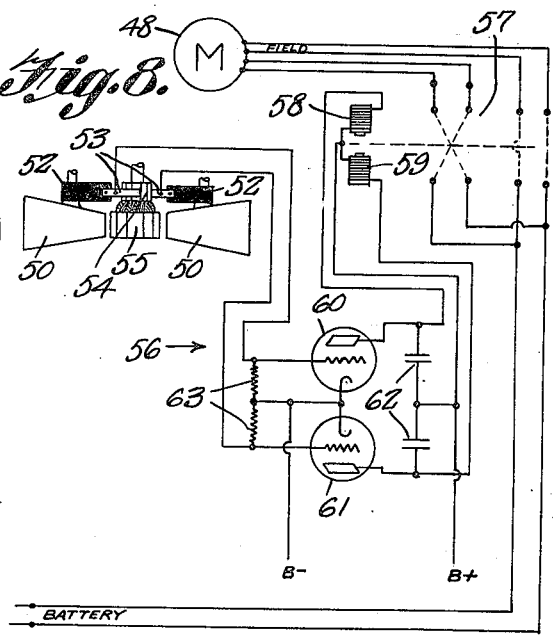
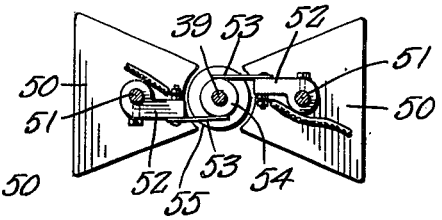
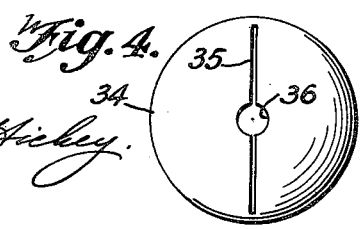
Walter S. Hunt,
Joe M. Francis,
INVENTORS

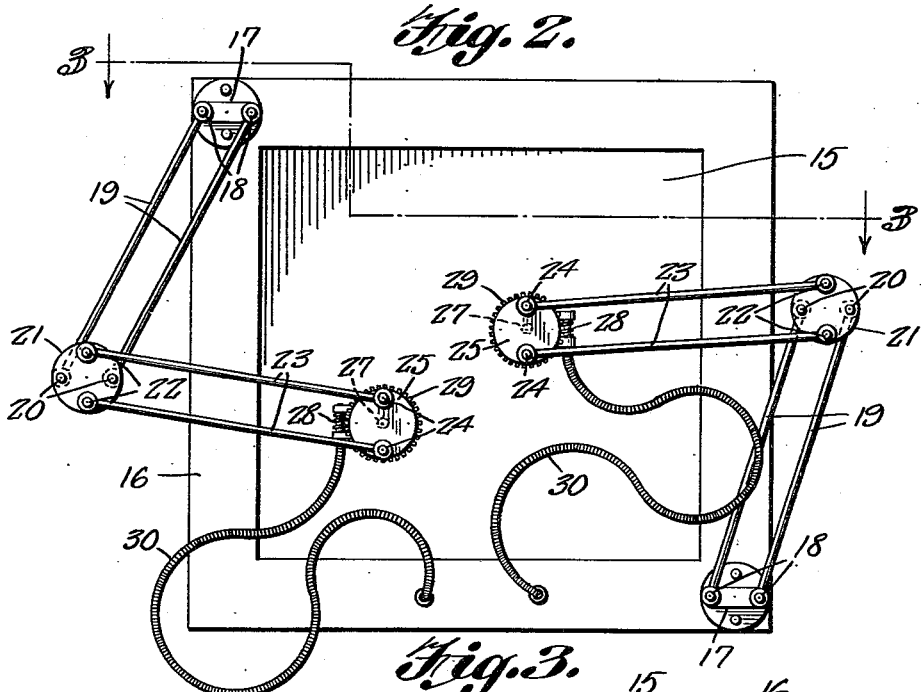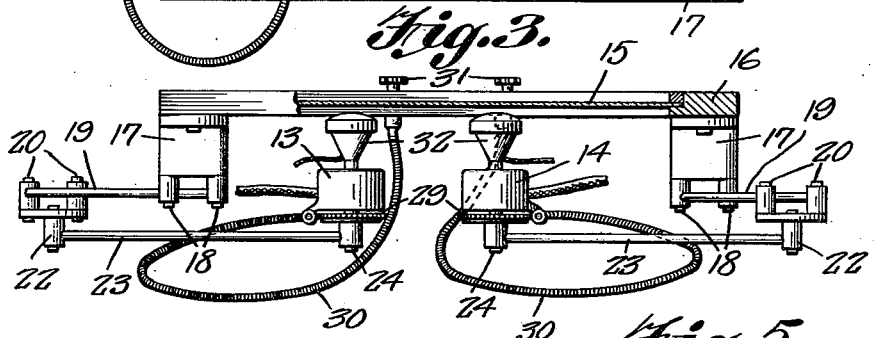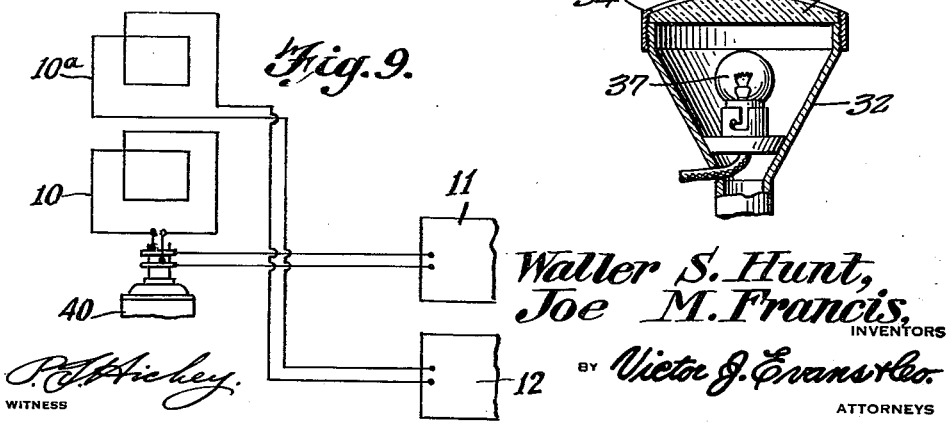

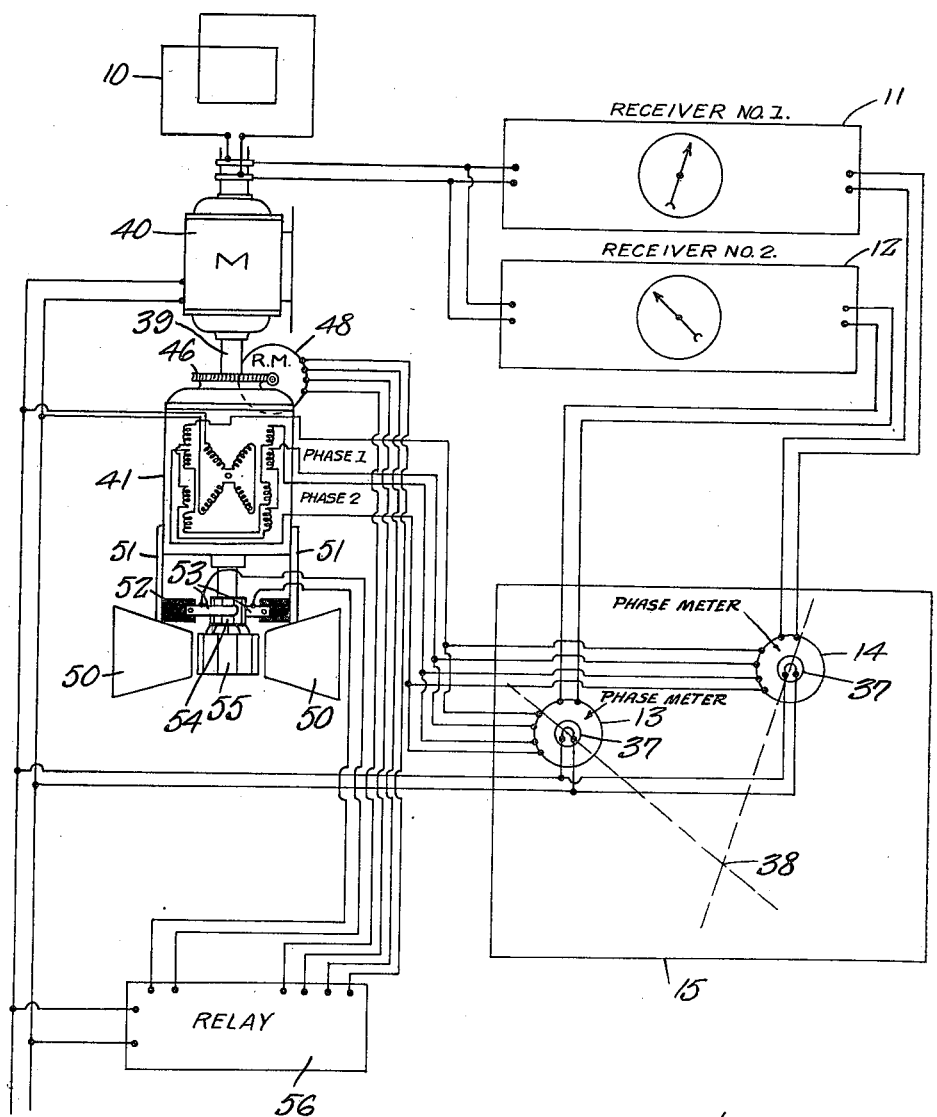

Patented Aug. 19, 1941

2,253,430

UNITED STATES PATENT OFFICE 2,253,430

RADIO CARTOGRAPHIC POSITION INDICATOR

Waller S. Hunt and Joe M. Francis, Roanoke, Va.

Application October 6, 1938, Serial No. 233,650

3 Claims. (Cl. 250—11)

The object of the invention is to provide a method as well as a means whereby position in any selected area may be definitely indicated; to provide means for graphic indication upon a map of the area in which the location is to be determined, so that the point or position to be ascertained may be made instantly visible on the map; to provide for automatically maintaining the coordinated positions of the parts necessary to successful operation; and generally to provide a radio cartographic indicator which, for the functions to be performed, is of comparatively simple form and therefore susceptible of cheap manufacture and sale.

With this object in view, the invention consists in a construction and combination of parts of which a preferred embodiment is illustrated in the accompanying drawings but to which the invention is not to be restricted. The right is reserved to make such changes or alterations as continued use in practice may determine to be necessary, in so far as such changes or alterations are comprehended by the spirit of the invention.

In the drawings:

Figure 1 is a side elevational view of the unit comprising the loop antenna, its actuating motor and two phase generator.

Figure 2 is a rear elevation of the map frame showing the phase meters and mounting arms thereof.

Figure 3 is a sectional view on the plane indicated by the line 3—3 of Figure 2.

Figure 4 is a front elevational view of one of the phase meter indicators.

Figure 5 is a diametrical sectional view of the structure of Figure 4.

Figure 6 is a top plan view of the earth inductor generator.

Figure 7 is a diagrammatic view illustrating the entire appliance constituting the invention.

Figure 8 is a diagrammatic view of the relay by which the generator stator adjusting motor is controlled.

Figure 9 is a fragmentary diagrammatic view of a two-loop antenna modification.

The loop 10, as an element of the invention, is rotated, so that it will pick up signals from remotely positioned stations in the area in which the position is to be ascertained. The receivers 11 and 12 have their inputs connected with the loop and are tuned respectively to the two stations and deliver their outputs to phase meters 13 and 14 respectively. The phase meters are mounted behind a map 15 carried preferably in a frame 16, from which the phase meters are supported on appropriate bracket arms of the form clearly illustrated in Figure 2, so that meters may be positioned at any points behind the map by the simple operation of moving them to the desired points, the arms on which they are mounted being of the character to provide longitudinal and latitudinal bodily movement without any angular or turning movement. The bracket arms each consist of a base post 17 secured to the frame 16 at a corner and provided with spaced studs 18 on which parallel bars 19 are pivotally mounted at their ends, the opposite ends of the bars being mounted on posts 20 positioned at diametrically opposite points on one face of the elbow disk 21. The elbow disk has on its opposite face similar posts 22 with which the bars 23 have pivotal connections at their ends, the remote ends of the bars 23 being pivotally mounted on posts 24 mounted on the back of the base disk 25 on which the phase meter is mounted but so supported that it may be rotated angularly on the point 27 which is coincident with the axis or center of the meter. A micrometer adjustment is provided to effect this angular or turning movement and this consists of a worm 28 mounted in appropriate bearings on the base disk 25 and meshing with a worm wheel 29 connected with the meter. The meter and adjustable bracket are mounted on the rear of the map frame 16 and in order that the minute adjustment may be effected from the front of the frame, the worm 28 is connected with a flexible shaft 30 led to a finger button or knob 31 on the front of the frame 16 preferably at the bottom thereof.

The phase meter is mounted so that the movable element rotates on an axis co-incident with the point 27 and the two meters are positioned so that the points 27 are directly behind the points on the map that indicate the positions of the stations to which the receivers 11 and 12 are tuned. The mounting arms for the phase meters, while permitting the vertical and lateral bodily movement, have the parts so connected frictionally that any position to which the phase meter is set is readily maintained. The micrometer adjustment provided by the knob 31 and flexible shaft 30 is to compensate for the irregularities of isogonic lines.

To the movable element of the phase meter, instead of the conventional indicator, there is attached a lamp housing 32 at the outer end of which is disposed a condensing lens 33 covered with a shield 34 in which is formed a diametrical slit 35 crossing a circular opening 36 at the center of the shield. Within the housing 32 is disposed a lamp 37. When energized, the light from the lamp is cast on the map in the form of a line with a spot of light indicating the center of the phase meter shaft, the beam of light being fan shaped when viewed laterally of the slot. When the phase meters are energized, as they are in the operation of the invention, these lines will be caused to intersect, as at 38, in Figure 7, and the intersection will indicate the exact position of the point sought to be ascertained—that is, the position of the vehicle on which the apparatus is mounted.

The invention is adapted for use with any sort of translational device, as for example, a land, air or water vehicle.

The loop 10 is carried at the upper end of a shaft 39 which is common to the rotor of the motor 40 and similarly to the rotor of the generator 41, having a lower thrust bearing 42 in a base 43 with which a standard 44 is connected. The motor 40 is secured to the standard 44 at the upper end, as indicated at 45, but the stator of the generator is indirectly secured to the standard, having a worm wheel 46 meshing with a worm 47 on the shaft of a motor 48 which is secured to the standard, as indicated at 49.

The purpose of the motor 48 is to effect angular or turning movement of the stator of the generator 41 for a purpose hereinafter appearing.

Mounted on the generator 41 and suspended from the lower end of the stator is an earth inductor generator, the flux gathering poles 50 being supported by stems 51 mounted on the stator 41 at diametrically opposite sides. Brush holders 52 are mounted on the stems 51 and carry brushes 53 which bear upon diametrically opposite sides of a commutator 54 forming an element of an armature 55 which is mounted upon the shaft 39 below the generator and above the thrust bearing 42, this armature being the earth inductor generator armature and positioned between the flux gathering poles in order to generate a current when the flux gathering poles are so positioned to make this function possible—that is, when the flux gathering poles deviate from normal true east-west positions.

The generator 41 which provides a rotating magnetic field for the phase meters is preferably two phase, although it may be three phases or more or single phase with a derived split phase of proper refinements in design. In the illustrated embodiment, the output of the generator is delivered to the stators of the phase meters 13 and 14. It is essential that the generator output be of the same periodicity as the outputs of the receivers. Since the loop antenna, when rotated in the fields of the transmitting stations will deliver to the receivers maximum radio frequency voltages at the instants the lines of direction of the stations pass diametrically through the loop and minimum voltages when said lines of direction pass axially through the loop, the radio frequency input to the receivers is varied in amplitude at a periodicity equal to twice the speed of rotation of the loop. Therefore, the effect of rotating the loop is to modulate the radio frequency carriers of the received stations. These modulations appear in the outputs of the receivers as alternating voltages. To provide for the same periodicity in the generator output as in the receiver outputs, therefore, the generator is wound four poles per phase, so as to avoid the necessity of gearing the generator to the loop, as would be necessary, were the generator made two poles per phase, for example, when it would be necessary to rotate the generator at twice the speed of the loop, with its attendant difficulties. Thus as the loop is rotated through positions of maximum and minimum signal strength, the receiver outputs, while synchronized with the generator output in point of time, have definite phase displacements with respect to the generator output, so that if the three sources of alternating voltage are properly coordinated, the phase relations can be cartographically indicated by the phase meters to definitely indicate the position sought.

Certain conditions may arise where a single loop will not give the best results and it may be necessary to employ a second loop and to tune the loops individually. In such a case, the loop 10 is surmounted with the loop 10a, as indicated in Figure 9, and its output is delivered to one receiver, as for example, the receiver 12, the output of the loop 10 being restricted to the receiver 11. The result of the use of two loops is the same as with the single loop, except that under certain conditions the dual loop may be found preferable because of the fact that the two loops can be tuned respectively to the two selected stations.

While it is essential that the stator of the generator be maintained at a definite position with respect to the direction of a magnetic meridian, this does not mean that a certain definite position for it must be ascertained originally. The generator may be arbitrarily positioned initially but coordination of the several parts depends on a known point of position for initial adjustment and the known positions of the selected stations. For example, suppose that the appliance be at the point 38, as shown in Figure 7, when the operation of coordinating the parts is undertaken. No definite position of the generator is necessary at that time except that the flux gathering poles 50 must be directly east and west which will of course call for definite positioning of the indicator if the poles are fixedly supported from the generator, as shown. However, if the pole mounting on the generator be adjustable, the generator can be set at any position to be followed by adjustment of the flux gathering poles to the true east-west position. The phase meters are of course positioned behind the map at the points of location of the selected stations thereon. Then the receivers are tuned to the selected stations and the apparatus is set in operation and the phase meter stators adjusted on their mountings until the streaks or lines of light from the movable elements of the two intersect at the point 38. The parts are then coordinated and the generator then has a definite position with respect to the direction of the magnetic meridian passing through that point and it is thereafter necessary that that position of the generator be maintained. And it is maintained thereafter automatically.

Assuming the translational apparatus on which the invention is mounted to change direction, so that the flux gathering poles swing out of their normal east-west position, they then begin to gather lines of force of terrestrial magnetism, thus providing for the armature 55 generating current. This current so generated will affect the relay 56 so that the motor 48 will be energized and thus rotate the generator stator to restore the latter to its normal position which is the direct east-west position of the flux gathering poles in which position the potential of the earth inductor generator is zero.

The lights 37 in the phase meters are energized from the same source as the motor 40, rotor of the generator 41, the relay 56 and motor 48. The relay 56 encloses a reversing switch graphically indicated at 57 in Figure 8. This switch controls both the armature and field circuits of the motor 48, but in opposite positions operates to change the direction of current in the armature to change the direction of rotation of the motor, one position of the switch 57 effecting rotation in one direction and the opposite position effecting rotation in the other direction.

The switch 57 normally is in open position and is moved to closed position in one direction by the magnet 58 and in the other direction by the magnet 59. These two magnets are respectively in the plate circuits of the triodes 60 and 61 and are shunted by by-pass condensers 62. The tubes are high mu triodes requiring no bias. The brushes of the earth inductor generator are connected one to the grid of each triode. Obviously if the flux gathering poles are swung in one direction, one brush 53 will be positive, while if the flux gathering poles are swung in the opposite direction the opposite brush will be positive. The two brushes being electrically connected to the grids of the two tubes and the return circuit being completed through the two coupling resistors 63, one grid or the other will be rendered positive on the earth inductor generator becoming active and will thus permit plate current to flow in its particular tube, energize the particular magnet in its plate circuit and effect the necessary operation of the switch 57. Thus the earth inductor generator operates as a means for automatically controlling the motor 48 to render the latter active to rotate in one direction or the other to adjust the stator of the generator 41 to its normal position where the flux gathering poles 50 will be directly east and west.

The movable elements of the phase meters may be damped by any of the conventional means for this purpose where damping is necessary to secure substantial accuracy of indication, as where the translational means is subject to continuous variations from horizontally, either laterally or longitudinally, such as is the case with an aeroplane in flight.

The invention having been described, what is claimed as new and useful is:

1. Means for determining location in a given area which comprises a rotating antenna for producing modulation of received signals, a polyphase generator synchronized with said antenna and generating current having a periodicity corresponding to the modulation produced by the antenna in receiving signals, a duality of receivers tuned to remotely positioned transmitters in said area and having their inputs connected with said antenna, a duality of phase meters having stationary and movable systems of magnetism, the generator having the outputs of its separate phases delivered one to one of the magnetic systems of each of the phase meters, the receivers having their outputs delivered one to the other system of magnetism of each of the phase meters, a map of the given area, the phase meters being adapted for the positioning of their movable systems of magnetism at points coincident with the points of position of the transmitters on the map, illuminating means carried by the movable systems of magnetism of the phase meters so that fans of light may be cast therefrom to define lines of light on the map, and adjustable mountings for the phase meters to provide for bodily adjustment either longitudinally or laterally of the map or both without angular or turning movement, the antenna and generator being so co-ordinated that the latter has a definite position with respect to the direction of the magnetic meridian passing through its point of location, the phase meters being provided with micrometric means for angular adjustment to compensate for irregularities of isogonic lines.

2. Means for determining location in a given area which comprises a rotating antenna for producing modulation of received signals, a polyphase generator synchronized with said antenna and generating current having a periodicity corresponding to the modulation produced by the antenna in receiving signals, a duality of receivers tuned to remotely positioned transmitters in said area and having their inputs connected with said antenna, a duality of phase meters having stationary and movable systems of magnetism, the generator having the outputs of its separate phases delivered one to one of the magnetic systems of each of the phase meters, the receivers having their outputs delivered one to the other system of magnetism of each of the phase meters, a map of the given area, the phase meters being adapted for the positioning of their movable systems of magnetism at points coincident with the points of position of the transmitters on the map, and illuminating means carried by the movable systems of magnetism of the phase meters so that fans of light may be cast therefrom to define lines of light on the map, the antenna and generator being so co-ordinated that the latter has a definite position with respect to the direction of the magnetic meridian passing through its point of location, the generator being provided with earth influenced magnetic means to automatically maintain it in its originally co-ordinated relation with the antenna, the said automatic means comprising an earth inductor generator, a motor operatively connected with the stator of the generator to rotate the said stator in either direction, a reversing switch controlling the motor, and a relay controlling the reversing switch and comprising triodes having their grids affected by said earth inductor generator.

3. Means for determining location in a given area which comprises a rotary antenna for producing periodicity modulation of received signals, a polyphase generator synchronized with said antenna and generating current having a periodicity corresponding to the modulation produced on received signals through rotation of the antenna, a plurality of phase meters having stationary and movable systems of magnetism, the outputs of the separate phases of the generator being delivered one to one of the magnetic systems of each of the phase meters, a plurality of receivers tuned one to one of a plurality of remotely positioned transmitters in said area and having their inputs connected to said antenna and their outputs delivered one to the other system of magnetism of each of the phase meters, an earth inductor generator coaxially positioned with respect to said first-mentioned generator, a motor controlled by said earth inductor generator and operatively connected with the stator part of said first-mentioned generator for maintaining the same in a predetermined position, a second motor axially aligned with said first-mentioned generator, and a single shaft connecting said antenna, the armature of said second motor, the rotor of said first-mentioned generator and the armature of said earth inductor generator.

WALLER S. HUNT.
JOE M. FRANCIS.